United States Patent
Gong et al.

(10) Patent No.: US 9,645,399 B2
(45) Date of Patent: *May 9, 2017

(54) AUTOSTEREOSCOPIC DISPLAY APPARATUS AND METHOD

(71) Applicant: SuperD Co. Ltd., Shenzhen (CN)

(72) Inventors: Xiaoda Gong, Shenzhen (CN); Honglei Wang, Shenzhen (CN); Lei Song, Shenzhen (CN)

(73) Assignee: SUPERD CO. LTD., Shenzhen (CN)

( * ) Notice: Subject to any disclaimer, the term of this patent is extended or adjusted under 35 U.S.C. 154(b) by 281 days.

This patent is subject to a terminal disclaimer.

(21) Appl. No.: 14/582,928

(22) Filed: Dec. 24, 2014

(65) Prior Publication Data

US 2015/0109549 A1    Apr. 23, 2015

Related U.S. Application Data

(63) Continuation-in-part of application No. 12/953,621, filed on Nov. 24, 2010, now Pat. No. 8,953,241.

(30) Foreign Application Priority Data

Oct. 19, 2010 (CN) .......................... 2010 1 0511742

(51) Int. Cl.
*G02B 27/22* (2006.01)
*G02F 1/1343* (2006.01)
*H04N 13/04* (2006.01)

(52) U.S. Cl.
CPC ... *G02B 27/2214* (2013.01); *G02F 1/134309* (2013.01); *H04N 13/0404* (2013.01);
(Continued)

(58) Field of Classification Search
CPC .... G02B 27/2214; G02B 3/005; G02B 27/26; G02B 27/22; G02B 27/225; G02B 3/0056;
(Continued)

(56) References Cited

U.S. PATENT DOCUMENTS 8,953,241 B2 * 2/2015 Song .................. G02B 27/2214
359/462
2003/0063186 A1 * 4/2003 Tomono ............. H04N 13/0404
348/51
(Continued)

FOREIGN PATENT DOCUMENTS

CN      102096200 A      6/2011
CN      102809868 A      12/2012
(Continued)

*Primary Examiner* — Scott J Sugarman
*Assistant Examiner* — Sharrief Broome
(74) *Attorney, Agent, or Firm* — Anova Law Group, PLC

(57) ABSTRACT

A three-dimensional (3D) display apparatus is provided for displaying a 3D image. The 3D display apparatus includes a display panel and a grating device coupled to the display panel. The display panel includes a plurality of display pixels arranged in a two-dimensional array, and each pixel includes multiple sub-pixels. The grating device includes a plurality of grating elements based on liquid crystal to guide lights associated with the plurality of display pixels into predetermined viewing directions. Further, the grating device is one of a lenticular lens grating and a slit grating, and the plurality of grating elements are arranged in parallel. The plurality of grating elements cover the plurality of display pixels and are tilted at an inclination angle with respect to the display pixels, and each grating element comprises a plurality of electrodes arranged at the inclination angle. Further, a width of the electrodes is less than or equal to a width of a sub-pixel and a width between any two electrode is less than or equal to a sub-pixel.

22 Claims, 14 Drawing Sheets

(52) U.S. Cl.
CPC ..... *H04N 13/0409* (2013.01); *H04N 13/0415* (2013.01); *H04N 13/0422* (2013.01)

(58) Field of Classification Search
CPC ........ G02B 3/14; G02B 3/0012; G02B 5/201; G02B 27/2264; G02B 3/0037; G02B 3/0043; G02B 3/0062; G02B 5/045; G02B 5/1842; G02B 2027/0118
USPC ................ 359/619–628, 423, 462, 473, 475, 359/376–378; 348/55–56, 59; 353/7
See application file for complete search history.

(56) References Cited

U.S. PATENT DOCUMENTS

| | | |
|---|---|---|
| 2011/0157498 A1 | 6/2011 | Kim et al. |
| 2013/0107174 A1 | 5/2013 | Yun et al. |

FOREIGN PATENT DOCUMENTS

| | | |
|---|---|---|
| CN | 102928988 A | 2/2013 |
| CN | 103091854 A | 5/2013 |
| CN | 103412409 A | 11/2013 |
| CN | 203732853 U | 7/2014 |
| CN | 103984181 A | 8/2014 |
| CN | 104122718 A | 10/2014 |
| TW | 201416715 A | 5/2014 |
| TW | 201437685 A | 10/2014 |

\* cited by examiner

AUTOSTEREOSCOPIC DISPLAY APPARATUS AND METHOD

CROSS-REFERENCES TO RELATED APPLICATIONS

This application is a continuation-in-part (CIP) of U.S. patent application Ser. No. 12/953,621, filed on Nov. 24, 2010, which claims the priority of Chinese patent application no. 201010511742.2 filed on Oct. 19, 2010, the entire contents of all of which are incorporated herein by reference.

FIELD OF THE INVENTION

The present invention generally relates to autostereoscopic display technologies and, more particularly, to methods and systems for reducing or removing Moire pattern in autostereoscopic display apparatus.

BACKGROUND

Nowadays, autostereoscopic display technologies are rapidly developing and there are increasingly demands on high performance autostereoscopic display devices. Autostereoscopic display devices do not require viewers to wear glasses with special lenses to achieve three dimensional (3D) perceptions.

FIG. 1 illustrates a conventional autostereoscopic display apparatus 1. Display apparatus 1 comprises a lenticular sheet 12 coupled to a pixel matrix-based display panel 11. Lenticular sheet 12 comprises a plurality of vertical lenticular elements aligned in parallel in the horizontal direction of display panel 11.

FIG. 2 illustrates another conventional autostereoscopic display apparatus 2. Display apparatus 2 comprises a parallax barrier 13 coupled to a pixel matrix-based display panel 11. Parallax barrier 13 comprises a plurality of vertical slits aligned in parallel in the horizontal direction of display panel 11.

However, such conventional autostereoscopic display apparatus often has Moire patterns, as a Moire pattern is a natural interference phenomenon that occurs when two separate periodically repetitive structures are overlapped with each other. In a conventional autostereoscopic display apparatus, Moire patterns appear because the regularly spaced grating elements interfere with the underlying display panel which has a grid structure. Moire pattern manifests itself as dark bands passing across the screen. This phenomenon renders 3D viewing experience uncomfortable and less pleasant to the viewer.

The disclosed methods and apparatus are directed to solve one or more problems set forth above and other problems.

BRIEF SUMMARY OF THE DISCLOSURE

One aspect of the present disclosure includes an autostereoscopic display apparatus. The autostereoscopic display apparatus includes a display panel having a plurality of display elements arranged in a two-dimensional array. The autostereoscopic display apparatus also includes a grating device coupled to the display device and having a plurality of grating elements to guide lights associated with three-dimensional (3D) display into predetermined viewing directions. Further, the plurality of grating elements cover the plurality of display elements and are tilted such that a tilted direction of the plurality of grating elements form a non-zero angle with respect to a diagonal direction of the plurality display elements.

Another aspect of the present disclosure includes a grating for use in an autostereoscopic display apparatus. The autostereoscopic display apparatus includes a display panel having a plurality of display elements arranged in a two-dimensional array. The grating includes a plurality of grating elements configured to cover the plurality of display elements to guide lights associated with three-dimensional (3D) display into predetermined viewing directions. Further, the plurality of grating elements are tilted such that a tilted direction of the plurality of grating elements form a non-zero angle with respect to a diagonal direction of the plurality display elements.

Another aspect of the present disclosure includes a method for use in an autostereoscopic display apparatus. The autostereoscopic display apparatus includes a display panel having a plurality of display elements arranged in a two-dimensional array. The method includes covering the plurality of display elements using a plurality of grating elements of a grating. The method also includes configuring the plurality of grating elements to be tilted such that a tilted direction of the plurality of grating elements form a non-zero angle with respect to a diagonal direction of the plurality display elements. Further, the method includes guiding lights associated with three-dimensional (3D) display into predetermined viewing directions by the plurality of grating elements.

Another aspect of the present disclosure includes a three-dimensional (3D) display apparatus for displaying a 3D image. The 3D display apparatus includes a display panel and a grating device coupled to the display panel. The display panel includes a plurality of display pixels arranged in a two-dimensional array, and each pixel includes multiple sub-pixels. The grating device includes a plurality of grating elements based on liquid crystal to guide lights associated with the plurality of display pixels into predetermined viewing directions. Further, the grating device is one of a lenticular lens grating and a slit grating, and the plurality of grating elements are arranged in parallel. The plurality of grating elements cover the plurality of display pixels and are tilted at an inclination angle with respect to the display pixels, and each grating element comprises a plurality of electrodes arranged at the inclination angle. Further, a width of the electrodes is less than or equal to a width of a sub-pixel and a width between any two electrode is less than or equal to a sub-pixel.

Another aspect of the present disclosure includes a grating device for use in a three-dimensional (3D) display apparatus having a display panel containing a plurality of display pixels arranged in a two-dimensional array. Each pixel comprising multiple sub-pixels and the grating device is coupled to the display panel. The grating device includes a plurality of grating elements based on liquid crystal to guide lights associated with the plurality of display pixels into predetermined viewing directions, and the grating device is one of a lenticular lens grating and a slit grating. The plurality of grating elements are arranged in parallel; and the plurality of grating elements are arranged to cover the plurality of display pixels and are tilted at an inclination angle with respect to the display pixels. Further, each grating element comprises a plurality of electrodes arranged at the inclination angle; a width of the electrodes is less than or equal to a width of a sub-pixel and a width between any two electrode is less than or equal to a sub-pixel.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
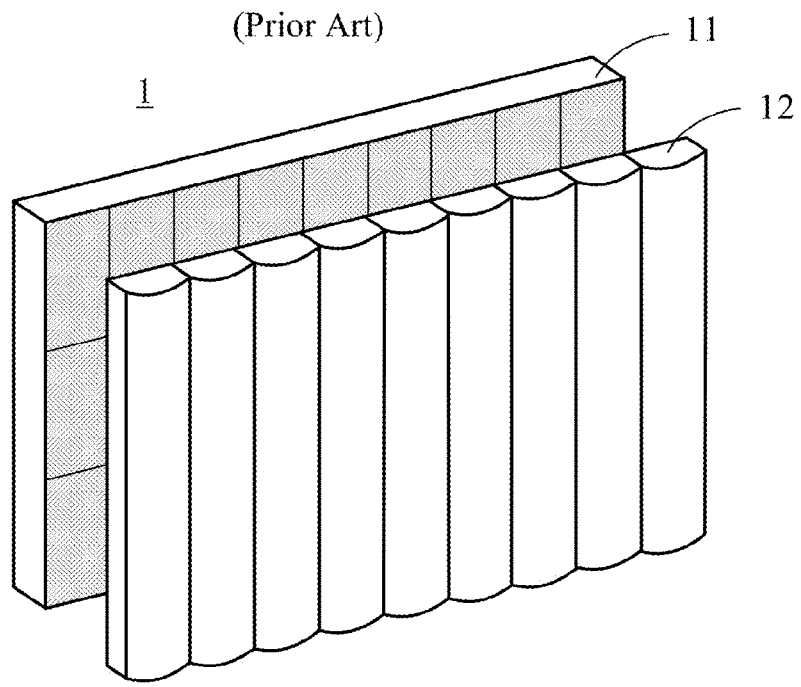
FIG. 1 illustrates a conventional autostereoscopic display apparatus.
Figure 2:
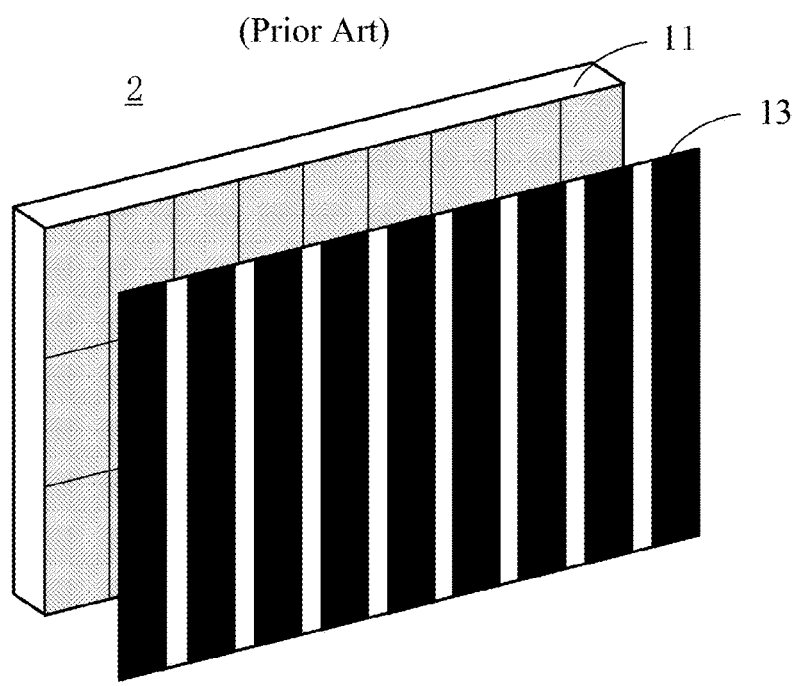
FIG. 2 illustrates another conventional autostereoscopic display apparatus.
Figure 3:
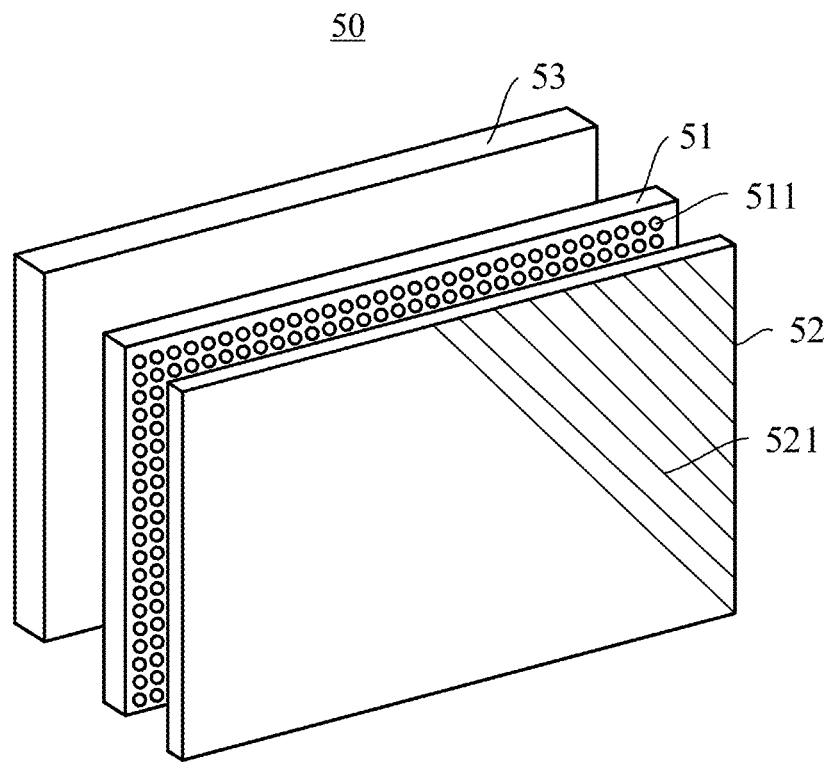
FIG. 3 illustrates an exemplary autostereoscopic display apparatus consistent with the disclosed embodiments.

FIG. 3 illustrates an exemplary autostereoscopic display apparatus consistent with the disclosed embodiment. As shown in FIG. 3, autostereoscopic display apparatus 50 comprises a display panel 51, a grating 52, and a backlight panel 53. Grating 52 is positioned parallel to display panel 51 or closely coupled to display panel 51.

Display panel 51 may include any appropriate display panel, such as a liquid crystal display (LCD) panel, a plasma display panel (PDP), a cathode ray tube (CRT) display, an organic light emitting diode (OLED), etc. Display panel 51 may include a plurality of individually addressable, regularly spaced, and substantially identical display elements 511. Display elements 511 may be arranged in rows and columns. Further, display panel 51 may be illuminated by backlight panel 53. Lights from backlight panel 53 are directed through display panel 51 with the display elements 511 individually addressed to produce a display output. In autostereoscopic display apparatus 50, a three-dimensional (3D) image usually includes a multitude of views corresponding to different viewing angles. These views may be spliced into the 3D image (i.e., a 3D display image). For example, a stereo format 3D image may include two images, a left image to be viewed by a viewer's left eye and a right image to be viewed by the viewer's right eye. Horizontally adjacent display elements 511 may display image elements belong to different views.

Grating 52 may include any appropriate type of grating device, such as a lenticular lens screen or a slit grating device. Grating 52 may include a plurality of grating elements 521 (only shown partially), and the plurality of grating elements 521 may be arranged in parallel with a predetermined interval. Further, grating elements 521 may be aligned over display panel 51 such that a single grating element 521 may cover two or more display elements 511.

Grating element 521 may include any appropriate optical element capable of separating adjacent views by directing lights from horizontally or vertically adjacent display elements 511 into different directions to be viewed by a viewer's left eye and right eye separately to achieve a 3D perception. In other words, grating 52 guides lights associated with 3D display into predetermined viewing directions to achieve 3D perception by the viewer. In certain embodiments, grating element 521 may include a lenticular lens or a parallax barrier (e.g., a slit).

Figure 4:
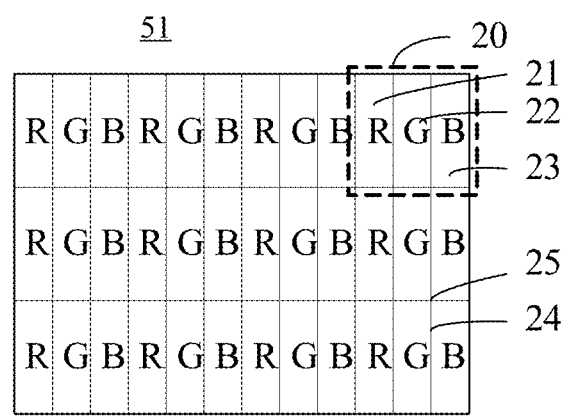
FIG. 4 illustrates exemplary display elements of a display panel consistent with the disclosed embodiments.

FIG. 4 illustrates a portion of display panel 51. As explained, display panel 51 includes a plurality of display elements 511. In certain embodiments, a display element 511 may include a pixel or a sub-pixel. That is, as shown in FIG. 4, display panel 51 may include a plurality of pixels 20. Pixel 20 may include several sub-pixels, such as a red sub-pixel 21, a green sub-pixel 22, and a blue sub-pixel 23. Other types of sub-pixels may also be included. Sub-pixels may be considered as basic display elements in display panel 51. Further, black mask line 24 may be used to define the borders of each individual display element 511. A plurality of rows and columns of black mask lines 24 form a grid with a plurality of points of intersection 25. The plurality of display pixels 20 may form a two-dimensional matrix arranged vertically and horizontally. Sub-pixels may be substantially identical in size and may be in rectangular shapes.

Figure 5:
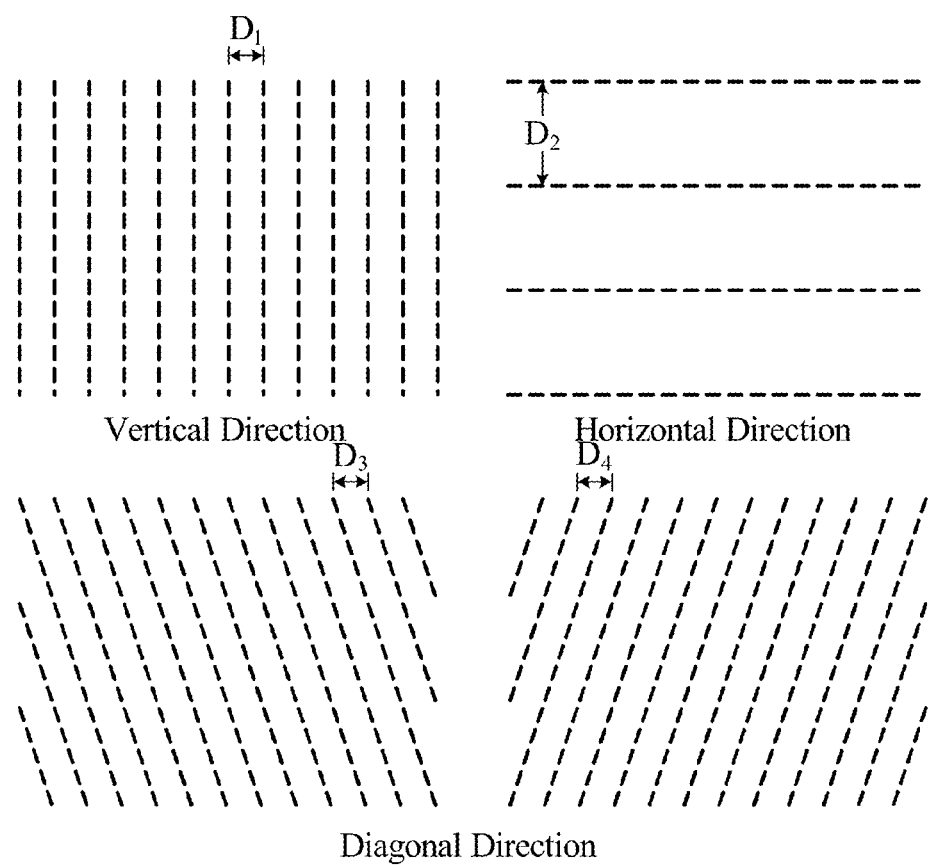
FIG. 5 illustrates exemplary grating arrangement positions consistent with the disclosed embodiments.

Grating 52 may be coupled to display panel 51 such that grating elements 521 may cover corresponding display elements 511 of display panel 51. FIG. 5 illustrates various arrangements for grating elements 521 to cover display panel 51. As shown in FIG. 5, grating elements 521 may be arranged in a vertical direction with a pitch $D_1$; in a horizontal direction with a pitch $D_2$; in a diagonal direction tilted left with a pitch $D_3$; or in a diagonal direction tilted right with a pitch $D_4$. Because the regularity of arranged grating elements 521 and the regularity of display elements 511 of display panel 51, Moire pattern may appear.

Figure 6:
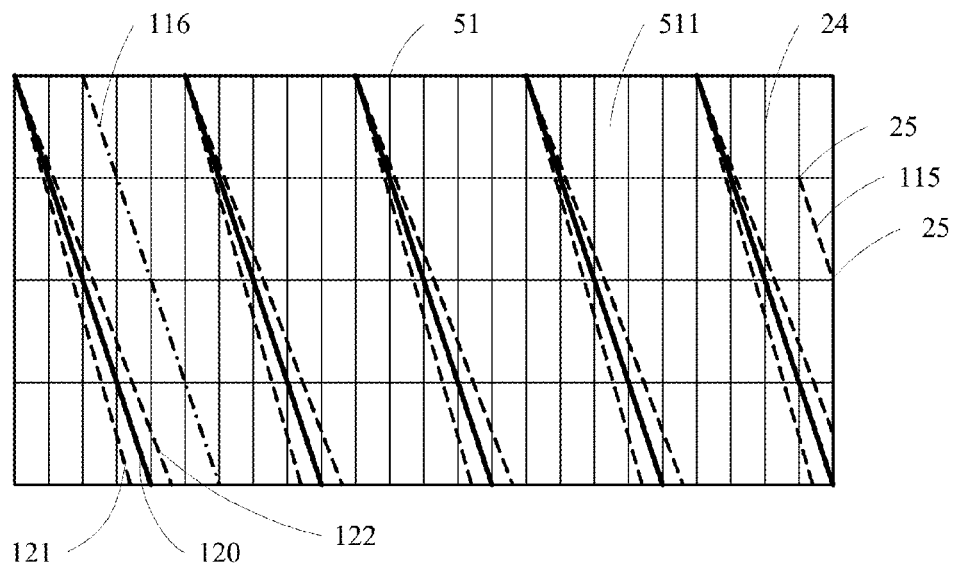
FIG. 6 illustrates an exemplary arrangement of a grating and a display panel consistent with the disclosed embodiments.

FIG. 6 illustrates another exemplary arrangement of grating elements of grating 52 with respect to display panel 51. Display panel 51 comprises a plurality of display element 511 which are separated by black mask lines 24 in both horizontal and vertical directions. Horizontal and vertical black mask lines 24 create a grid of display elements. For example, corner points 25 may be formed when creating the grid. A diagonal direction 115 may be referred to as the diagonal line connecting two opposing corner points in a same grid unit.

Display panel 51 or display elements 511 may also have a diagonal direction 116, which may be referred as the diagonal line of an individual display element 511 and thus also as the diagonal line of all corresponding regularly arranged display elements 511 across display panel 51.

Further, grating 52 is coupled to display panel 51 and includes a plurality of grating elements 521. Only certain number grating elements are illustrated here, as grating ridge lines 120, grating ridge lines 121, and grating ridge lines 122 illustrate individual grating elements 521 at different locations. A ridge line may refer to a center line of a grating element 521 or a bottom border line of a grating element 521 used to indicate a position and a slant angle of the grating element 521. Other lines may also be included to indicate positions and slant angles of plurality of grating elements 521. Among ridge lines 120, 121, and 122, ridge line 120 may be referred to as a reference ridge line, and ridge lines 121 and 122 are actual ridge lines of two different arrangements between grating 52 and display panel 51. Ridge lines 120, 121, and 122 may be tilted (e.g., with a slant angle).

As shown in FIG. 6, reference ridge line 120 may be parallel to diagonal line 116 of display panel 51, which may also be parallel to diagonal line 115 of black mask line grid. Although this arrangement may allow individual display elements 511 to be divided equally into two parts of same shape and same size to create desired 3D images, the substantial evenness and regularity provided by this arrangement may cause substantial Moire patterns.

Thus, actual ridge lines 121 and 122 are formed based on reference ridge line 120 to reduce or remove Moire patterns. As shown in FIG. 6, in certain embodiments, actual ridge line 121 is used to arrange grating elements 521 with respect to display panel 51; while in certain other embodiments, actual ridge line 122 is used to arrange grating elements 521 with respect to display panel 51. Further, any lines between actual ridge lines 120 and 121 may be used as an actual ridge line for grating elements 521.

Actual ridge line 121 is formed by rotating reference ridge line 120 clockwise by a certain degree (a positive degree), and actual ridge line 122 is formed by rotating reference ridge line 120 counter-clockwise by a certain degree (a negative degree). The rotation pivotal point may be any end point of reference ridge line 120 (e.g., the upper end of reference ridge line 120) or an intersection point between actual ridge line 120 and a diagonal direction of display elements 511. Such positive and negative adjustment to reference ridge line 120 may create arrangements with substantially less Moire pattern than reference ridge line 120.

Further, any appropriate degrees of adjustment angle (i.e., the angle between a ridge line and the diagonal direction of display elements 511) may be used to adjust reference ridge line 120. For example, an adjustment range may be set to between −5 to +10 degrees, with the diagonal direction as reference. In certain embodiments, the adjustment range may be set to between −2 to +7 degrees. Within this adjustment ranges, any angle may be used based on particular applications. Different angles within the adjustment range may also be tested to choose a desired angle such that a pitch of Moire pattern is so small that the Moire pattern cannot be distinguished by human eyes. Further, the slant angle of grating elements 521 may also be adjusted to accommodate various display panels for removing Moiré patterns from autostereoscopic display screens.

Figure 7:
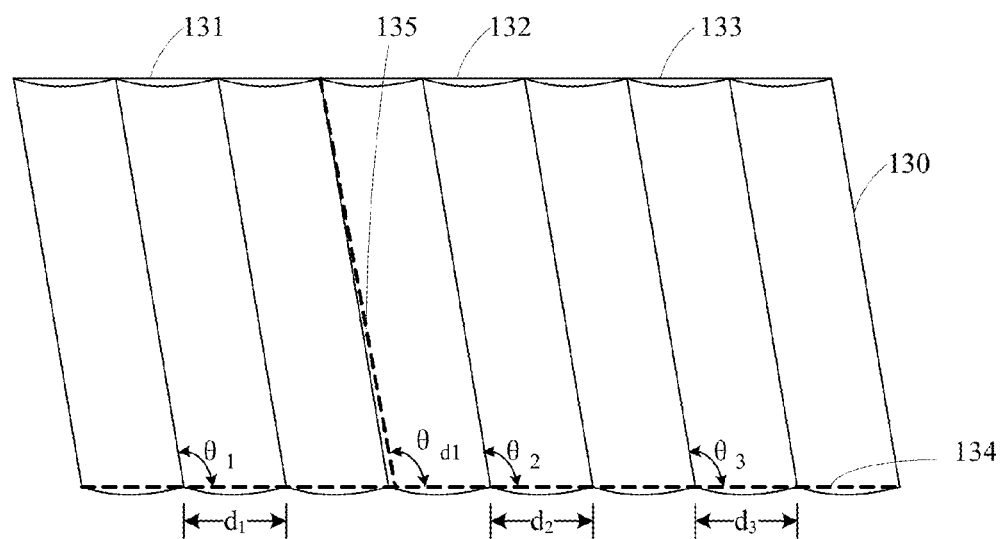
FIG. 7 illustrates another exemplary arrangement of a grating and a display panel consistent with the disclosed embodiments.

As explained previously, grating 52 may include any appropriate grating devices, such as a lenticular lens screen or a slit grating. FIG. 7 illustrates an exemplary arrangement of a lenticular lens screen with respect to display panel 51. As shown in FIG. 7, lenticular lens screen or lenticular sheet 130 comprises a plurality of lenticular lenses or elements 131, 132, and 133. A cross-section direction 134 of lenticular sheet 130 aligns with the horizontal direction of display panel 51. A diagonal direction 135 of display panel 51 may form an angle $\theta_{d1}$ with respect to cross-section direction 134 or the horizontal direction.

Lenticular elements 131, 132, and 133 are individual lenticular elements listed for illustrative purposes. Any lenticular element may be used. As shown in FIG. 7, lenticular element 131 has a pitch $d_1$ and an angle $\theta_1$ with respect to cross-section direction 134 or the horizontal direction. Lenticular element 132 has a pitch $d_2$ and an angle $\theta_2$ with respect to cross-section direction 134 or the horizontal direction. Further, lenticular element 133 has a pitch $d_3$ and an angle $\theta_3$ with respect to cross-section direction 134 or the horizontal direction.

Lenticular elements 131, 132, and 133 are arranged un-parallel to diagonal direction 135 of display panel 51. In other words, angles $\theta_1$, $\theta_2$ and $\theta_3$ are different from $\theta_{d1}$. The difference between $\theta_{d1}$ and any of angles $\theta_1$, $\theta_2$ and $\theta_3$ may be the adjustment angle explained with respect to FIG. 6. Such arrangement may reduce Moire pattern to certain level beyond recognition of human eyes. Further, lenticular elements 131, 132 and 133 may extend or arranged in parallel with one another, which means angles $\theta_1$, $\theta_2$ and $\theta_3$ have the same value. Further, pitches $d_1$, $d_2$ and $d_3$ may also be of the same value.

Figure 8:
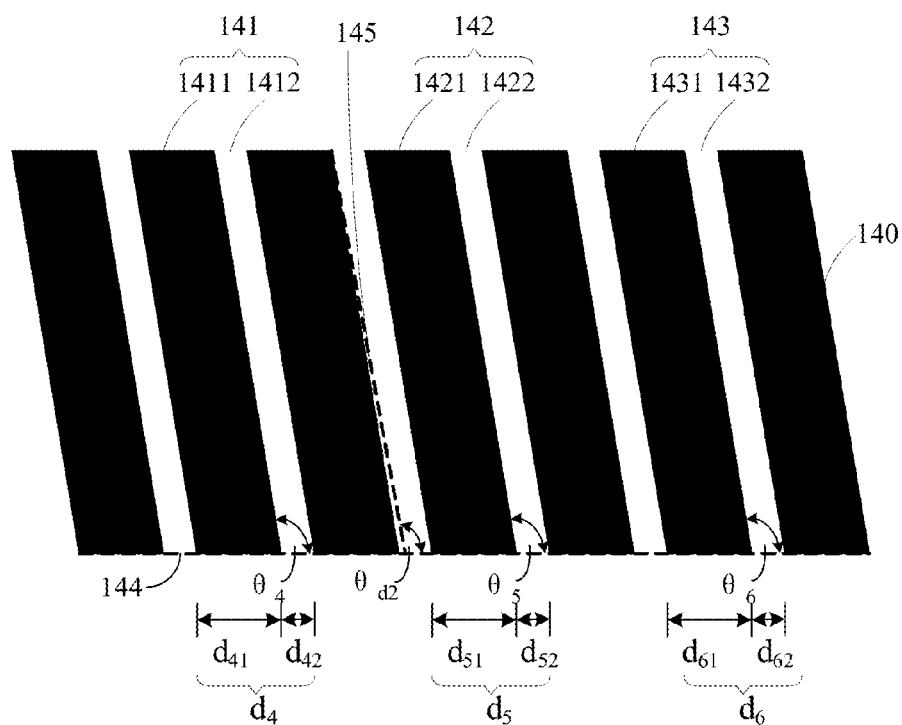
FIG. 8 illustrates another exemplary arrangement of a grating and a display panel consistent with the disclosed embodiments.

FIG. 8 illustrates an exemplary arrangement of a parallax barrier with respect to display panel 51. As shown in FIG. 8, parallax barrier 140 includes a plurality of parallax barrier elements 141, 142, and 143. Parallax barrier element 141 includes a barrier portion 1411 and a slit portion 1412. Similarly, parallax barrier element 142 includes a barrier portion 1421 and a slit portion 1422, and parallax barrier element 143 includes a barrier portion 1431 and a slit portion 1432. A cross-section direction 144 of parallax barrier 140 aligns with the horizontal direction of display panel 51. A diagonal direction 145 of display panel 51 may form an angle $\theta_{d2}$ with respect to cross-section direction 144 or the horizontal direction.

Parallax barrier elements 141, 142, and 143 are individual parallax barrier elements shown for illustrative purposes. Any parallax barrier element may be used. As shown in FIG. 8, parallax barrier element 141 has a pitch $d_4$ (barrier portion 1411 has a pitch $d_{41}$, and slit portion has a pitch $d_{42}$, $d_4=d_{41}+d_{42}$) and an angle $\theta_4$ with respect to cross-section direction 144 or the horizontal direction. Parallax barrier element 142 has a pitch $d_5$ (barrier portion 1421 has a pitch $d_{51}$, and slit portion has a pitch $d_{52}$, $d_5=d_{51}+d_{52}$) and an angle $\theta_5$ with respect to cross-section direction 144 or the horizontal direction. Further, parallax barrier element 143 has a pitch $d_6$ (barrier portion 1431 has a pitch $d_{61}$, and slit portion 1432 has a pitch $d_{62}$, $d_6=d_{61}+d_{62}$) and an angle $\theta_6$ with respect to cross-section direction 144 or the horizontal direction.

Parallax barrier elements 141, 142, and 143 are arranged un-parallel to diagonal direction 145 of display panel 51. In other words, angles $\theta_4$, $\theta_5$ and $\theta_6$ are different from $\theta_{d2}$. The difference between $\theta_{d2}$ and any of angles $\theta_4$, $\theta_5$ and $\theta_6$ may be the adjustment angle explained with respect to FIG. 6. Such arrangement may reduce Moire pattern to certain level beyond recognition of human eyes. Further, parallax barrier elements 141, 142 and 143 may extend in parallel with one another, which means angles $\theta_4$, $\theta_5$ and $\theta_6$ are of the same value. In addition, pitches $d_4$, $d_5$ and $d_6$ may also be of the same value. Barrier portion pitches $d_{41}$, $d_{51}$ and $d_{61}$ and/or slit pitches $d_{42}$, $d_{52}$ and $d_{62}$ may also be of the same values.

The gratings in the above examples are not limited to lenticular sheet gratings and parallax barrier gratings. Those skilled in the art understand many different types of gratings may be used. Further, the gratings can be of static or dynamic nature. For example, a slant angle, pitch, thickness, etc., of a lenticular sheet or a parallax barrier grating may be dynamically adjusted mechanically or by using piezoelectric or electro-optic devices.

Figure 9:
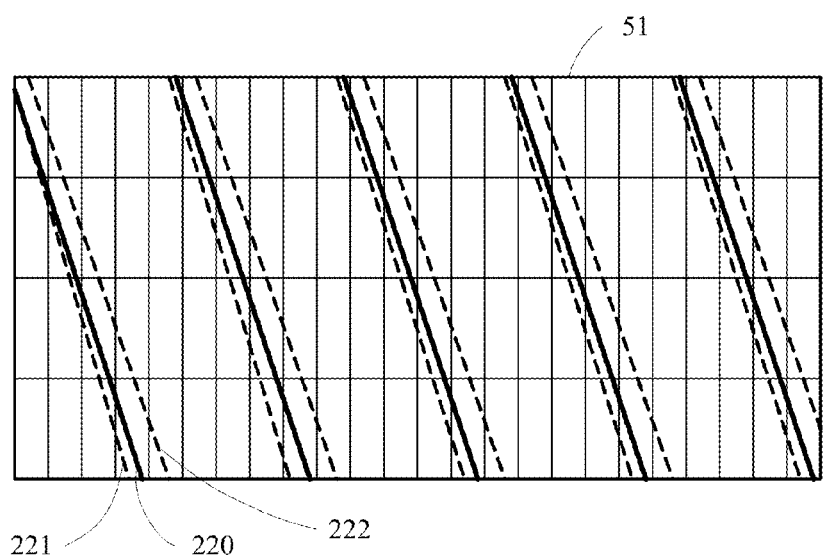
FIG. 9 illustrates another exemplary arrangement of a grating and a display panel consistent with the disclosed embodiments.

FIG. 9 illustrates another exemplary arrangement of grating 52 with respect to display panel 51. This exemplary arrangement is similar to that described in FIG. 6, with a reference ridge line 220 and actual ridge lines 221 and 222. The difference between FIG. 9 and FIG. 6 is that, in addition to rotation to the reference ridge 220, actual ridge lines 221 and/or 222 may also have a shift along the horizontal direction. Both rotation and shifting may be more flexible than rotation only. Further, the angle adjustment for actual ridge lines 221 and 222 may be set to a range of −5 to 10 degrees.

Figure 10:
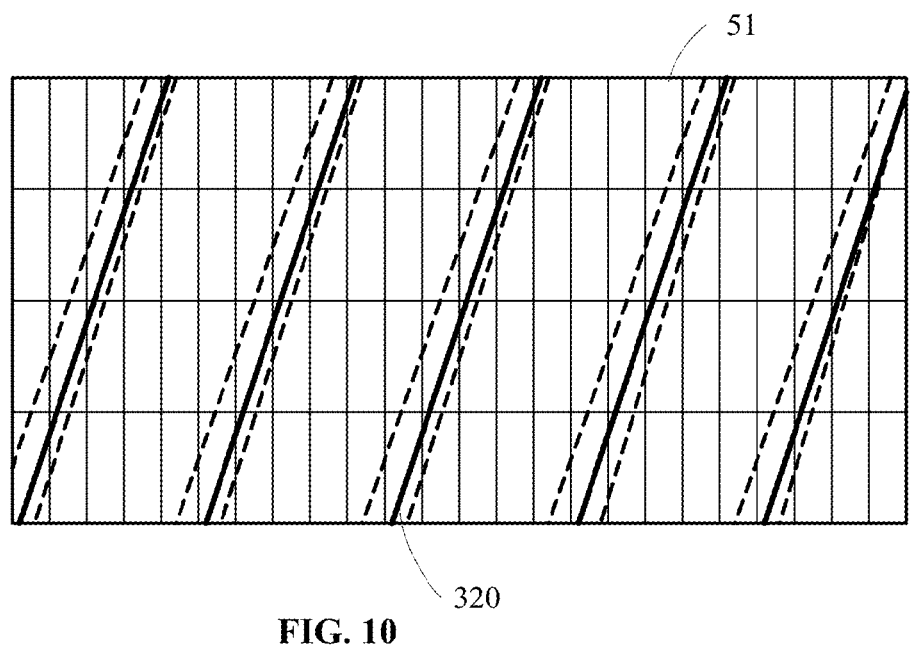
FIG. 10 illustrates another exemplary arrangement of a grating and a display panel consistent with the disclosed embodiments.

FIG. 10 illustrates yet another exemplary arrangement of grating 52 with respect to display panel 51. This exemplary arrangement is similar to that described in FIG. 9. The difference is that, in this arrangement, reference ridge line 320 of grating 52 is aligned parallel to the other diagonal direction of display panel 51 (e.g., tilted right instead of left).

Moire pattern may be effectively removed by using the above-mentioned systems and methods. However, because the rotation and/or shifting, display elements may be unable to completely evenly and regularly align with grating elements. Lights from display elements may be processed by grating elements with irregularity. For example, display elements belong to one view may then be misdirected to adjacent views instead. Suitable image processing algorithms may be used to compensate the irregularity of intersection between the grating elements and display elements.

Autostereoscopic display apparatus 50 may also include a controller (not shown) for providing control and operation functions for autostereoscopic display apparatus 50. For example, the controller may provide driving voltages to various components of autostereoscopic display apparatus 50. The controller may also provide image processing functions during run-time to improve display quality of autostereoscopic display apparatus 50.

The controller may include a processor such as a graphic processing unit (GPU), general purpose microprocessor, digital signal processor (DSP) or microcontroller, and application specific integrated circuit (ASIC). The controller may also include other devices such as memory devices, communication devices, input/output devices, driving circuitry, and storage devices, etc. The controller may also execute sequences of computer program instructions to perform various processes associated with autostereoscopic display apparatus 50. For example, during operation, the controller may perform an image processing process to adjust display quality due to the irregularity of intersection between grating elements and display elements.

More particularly, the controller may re-calculate or adjust values of display elements 511 to compensate the irregularity. For example, because the irregularity may cause a first display element from a first view point being displayed together with a portion of a second and neighboring display element from a second view point and, if applicable, a portion of a third or more neighboring display element from a third or more view point, the controller may re-calculate or adjust the value for the first display element using the second display element or the second display element and the third or more display elements.

Figure 11:
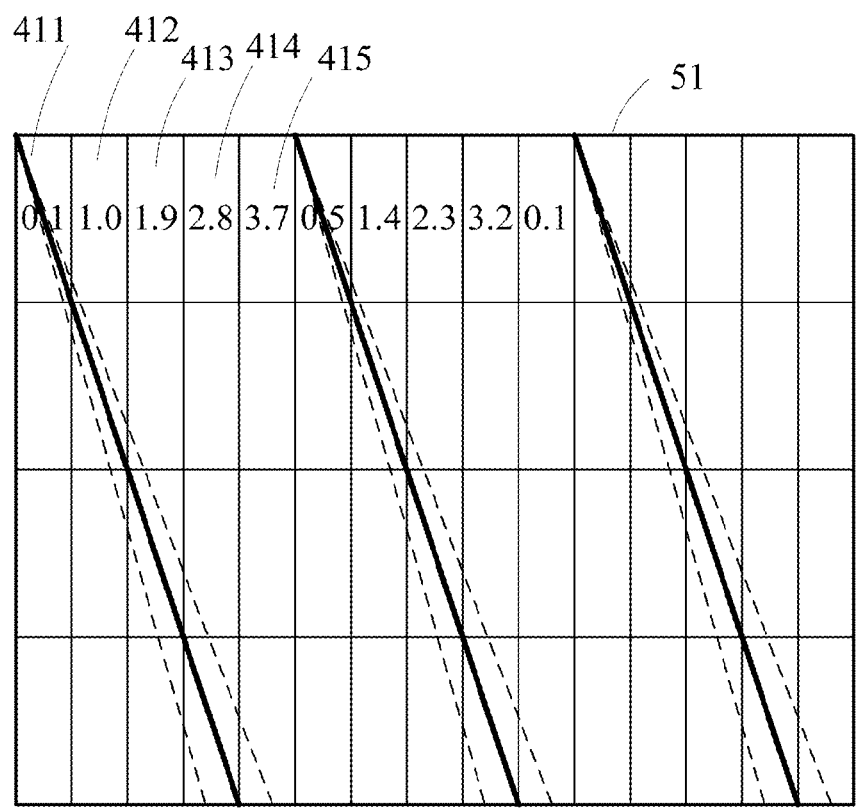
FIG. 11 illustrates another exemplary arrangement of a grating and a display panel consistent with the disclosed embodiments.

Further, the controller may use any appropriate type of algorithm to re-calculate or adjust values of each of display elements 511. For example, the controller may use an interpolation algorithm to adjust values of each of display elements 511 based on corresponding neighboring display elements. Other algorithm, however, may also be used. FIG. 11 illustrates another exemplary arrangement of grating 52 with respect to display panel 51 with display element adjustment ability.

As shown in FIG. 11, grating elements of grating 52 are arranged with a particular angle as explained previously. Irregularity may be introduced due to the relative arrangement of grating elements of grating 52 and display elements of display panel 51. For illustrative purposes, display elements (e.g., sub-pixels) from one row of display panel 51 between two actual ridge lines are listed as elements 411, 412, 413, 414, and 415. Each element may belong to an image of a different view point. For example, element 411 may belong to a first view point image, element 412 may belong to a second view point image, element 413 may belong to a third view point image, element 414 may belong to a fourth view point image, and element 415 may belong to a fifth view point image. Between neighboring elements or view point images, a certain parallax may be maintained for effecting 3D perception or 3D display. Other elements or viewpoints may also be used.

During operation, to compensate for the irregularity, the controller (not shown) may adjust the value of a particular display element of a view point image based on one or more other display elements from different view point images. The value of the particular display element may include a gray scalar value, a color scalar value, or any other value of a display element such as a pixel or a sub-pixel. For example, the controller may re-calculate the value of element 411 of the first view point image based on the original value of element 411 and the value of element 412 of the second view point image. In a multi-view format, the controller may re-calculate the value of a display element based on multiple images corresponding to multiple view points.

A decimal format number x.y may be used to represent a relationship between display elements for calculating the value of a particular display element. For example, integer part x may refer to the number of original or a base view point image, and fraction party may refer to a percentage of the value of the element of the neighboring view point image or another view point image along the forward direction of ridge lines to be used to adjust the value of the original display element. For example, the respective value relationships of elements 411, 412, 413, 414, and 415 are 0.1, 1.0, 1.9, 2.8, and 3.7.

More particularly, for example, element 414 has a decimal number 2.8, whose integer part 2 means the original or base element is from the third view point image (starting from 0), thus the neighboring view point image along the forward direction of ridge lines is the fourth view point image, and fraction part 0.8 means eighty (80) percentage of the element from fourth view point image should be counted to calculate the value of element 414, while remaining twenty (20=100−80) percentage from the original or base view point image (i.e., the third view point image) should be counted. That is: current value (element 414)=original value (element 413)× 20%+original value (element 414)×80%.

Similarly, element 411 has a decimal number of 0.1, current value (element 411)=original value (element 411)× 90%+original value (element 412)×10%. Element 412 has a decimal number of 1.0, no recalculation is need since none of other view point image should be counted. Further, element 413 has a decimal number of 1.9, current value (element 413)=original value (element 412)×10%+original value (element 413)×90%. Element 415 has a decimal number of 3.7, current value (element 415)=original value (element 414)×30%+original value (element 415)×70%. The original value may include color, non-color, or other type of value of display elements. Other algorithms may also be used.

Thus, during operation, values of display elements of display panel 51 are re-calculated or adjusted before the values of display elements are displayed to reduce irregularities because of the particular angle of arrangement for grating 52 and display panel 51. The re-calculated or adjusted values may then be displayed on display panel 51. The set of adjustment numbers of all display elements of display panel 51 may be pre-determined or stored in a database or other storage medium, such as a hard disk, on display apparatus 50. Further, more than one set of adjustment numbers of display elements of display panel 51 may be used, and a user of display apparatus 50 may select a particular set of adjustment numbers or may modify a particular set of adjustment numbers through certain user input devices.

Figure 12:
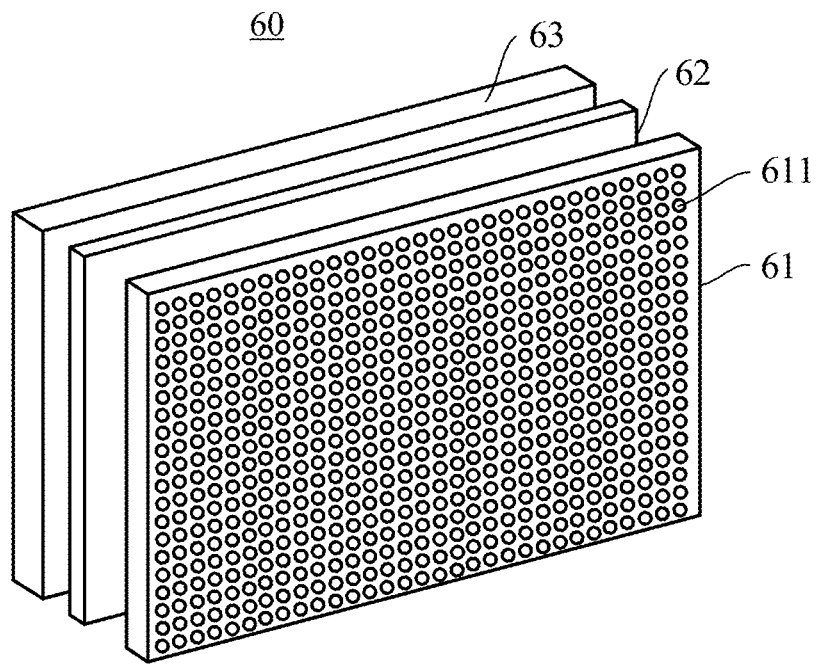
FIG. 12 illustrates another exemplary autostereoscopic display apparatus consistent with the disclosed embodiments.

FIG. 12 illustrates another exemplary autostereoscopic display apparatus 60 consistent with the disclosed embodiment. As shown in FIG. 12, similar to autostereoscopic display apparatus 50, autostereoscopic display apparatus 60 comprises a display panel 61, a grating 62, and a backlight panel 63. Display panel 61 comprises a plurality of individually addressable, regularly spaced, and substantially identical display elements 611. Display elements 611 may be arranged in rows and columns.

Further, different from autostereoscopic display apparatus 50, grating 62 is positioned between backlight panel 63 and display panel 61. Grating 62 is aligned substantially parallel to display panel 61.

Lights from backlight panel 63 may enter grating 62 first. Grating 62 may guide the lights from backlight panel 63 into different viewing directions to illuminate display panel 61. Display elements 611 may further respectively receive the lights from different viewing directions and may also modulate the received lights to display 3D images.

Figure 13:
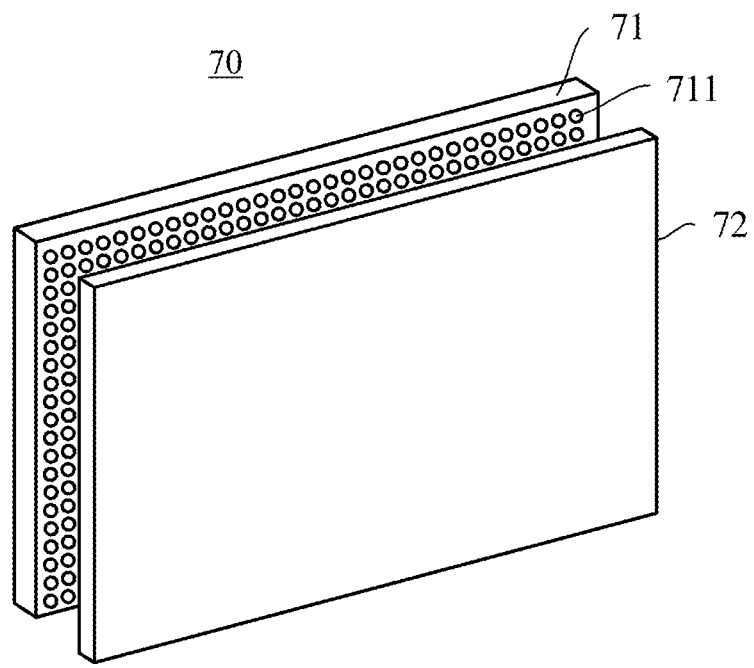
FIG. 13 illustrates another exemplary autostereoscopic display apparatus consistent with the disclosed embodiments.

FIG. 13 illustrates another exemplary autostereoscopic display apparatus 70 consistent with the disclosed embodiment. As shown in FIG. 13, autostereoscopic display apparatus 70 comprises a display panel 71 and a grating 72. Similar to autostereoscopic display apparatus 50, grating 72 is aligned substantially parallel to display panel 71 or closely coupled to display panel 71, and display panel 71 may include a plurality of individually addressable, regularly spaced, and substantially identical display elements 711 arranged in rows and columns. Different from autostereoscopic display apparatus 50, however, display panel 71 may be a self-luminous or light-emitting display panel that actively emits lights without a need of a backlight panel. Thus, grating 72 and display panel 71 may be coupled to provide 3D display.

In the disclosed embodiments above, various arrangements of grating 52 or grating 72 (e.g., lenticular lens grating, slit or barrier grating) are described, and various grating elements 521 of the grating 52 may be arranged to cover display panel 51. The grating elements may be implemented in liquid crystal, i.e., a liquid crystal lens or slit grating element.

Figure 14:
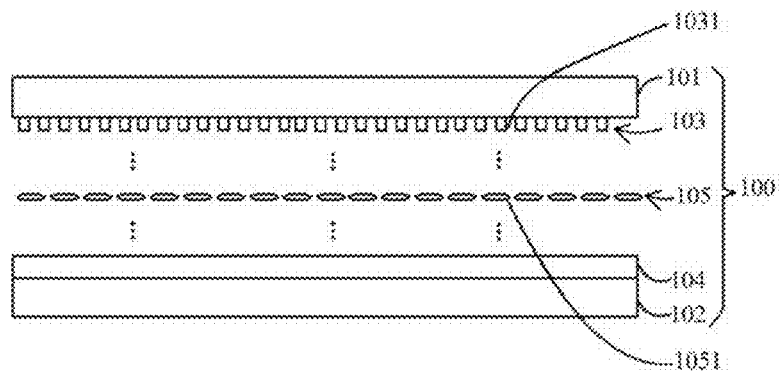
FIG. 14 illustrates an exemplary liquid crystal grating consistent with the disclosed embodiments.

FIG. 14 illustrates an exemplary liquid crystal lens/slit array implementation consistent with the disclosed embodiments. As shown in FIG. 14, grating 52 is implemented as a liquid crystal lens array 100, and the liquid crystal lens array 100 may include a first substrate 101, a second substrate 102, a first electrode layer 103, a second electrode layer 104, and a liquid crystal layer 105. Other components may also be included, and grating 52 can also be implemented as a liquid crystal slit grating array.

First substrate 101 and/or second substrate 102 may be configured correspondingly and may be in a plate shape made from transparent materials such as glass, silicon, or synthetic resin. First electrode layer 103 may be attached or built on the inside surface of first substrate 101 facing second substrate 102. First electrode layer 103 may include a plurality of strip-shaped electrodes 1031, and each of the plurality of electrodes 1031 may be arranged in parallel with a certain distance between each other.

Second electrode layer 104 may be attached or built on the inside surface of second substrate 102 facing first substrate 101, and corresponding to first electrode layer 103. Second electrode layer 104 may include a single plate electrode or a plurality of electrodes similar to first electrode layer 103. Further, first electrode layer 103 and second electrode layer 104 may be made of transparent materials, such as Indium Tin Oxides (ITO), Indium Zinc Oxide (IZO), or a-Indium Tin Oxides (a-ITO).

The first electrode layer 103 and the second electrode layer 104 are described for illustrative purposes. The positions of the first electrode layer 103 and the second electrode layer 104 may be interchangeable, and the first electrode layer 103 or the second electrode layer 104 may be omitted.

Further, liquid crystal layer 105 may be placed between first electrode layer 103 and second electrode layer 104, and may be sealed between first electrode layer 103 and second electrode layer 104. For example, UV (Ultraviolet Rays) light curing adhesive may be used to seal the edges of the space between first electrode layer 103 and second electrode layer 104 such that a sealed space may be formed between first electrode layer 103 and second electrode layer 104. The sealed space may then be used to contain liquid crystal layer 105. Further, liquid crystal layer 105 may contain many liquid crystal molecules 1051. A liquid crystal molecule 1051 may be in a rod shape and have a long axis along the rod direction. Under the effect of an electric field between first electrode layer 103 and second electrode layer 104, liquid crystal molecules 1051 may change directions or orientations, e.g., changes the direction of the long axis. For illustrative purposes and without limiting, a positive dielectric anisotropic liquid crystal is used. Other types of liquid crystal, however, may also be used.

To obtain 3D image display, a driving voltage may be controlled to provide a fixed voltage on second electrode layer 104, and to provide each strip electrode 1031 of first electrode layer 103 with various driving voltages. Because liquid crystal molecules 1051 rotate in different angles under different voltages, liquid crystal molecules 1051 at different electrodes may rotate in different angles. Further, because different degrees of rotation give liquid crystal molecules 1051 different refractive indices, liquid crystal molecules 1051 between the total 2n number of electrodes centered at the n-th electrode may form a lens structure (or a lens unit). Similarly, liquid crystal lens array 100 may include many lens structures with the same configurations to form a continuous lens array.

More specifically, when the grating elements are arranged to cover the display panel, i.e., pixels of the display panel, because the grating elements are arranged at a specified inclination angle, electrodes in the grating elements are arranged in parallel in accordance with a certain inclination angle (left or right). The angle is typically about 70±10°, according to the specific circumstances of the pixel arrangement of the display panel, and may be selected as described previously.

At the same time, each grating element or lens unit may be implemented by a plurality of electrodes, and the distribution and the shape of the electrodes may be symmetrical along a center line of the grating element or lens unit.

In general, the driving voltages applied at two electrodes on both sides of the liquid crystal lens unit are the largest and are greater than U-threshold (a threshold voltage of the liquid crystal molecules in the liquid crystal lens unit). The applied voltages are further in a decreasing pattern from both sides to the center of the liquid crystal lens unit simultaneously and symmetrically. The driving voltages applied on any two electrodes symmetric to the center of the liquid crystal lens unit are equal. Further, when multiple electrodes (i.e., more than two) are used to implement a single liquid crystal lens unit, the driving voltages on the electrodes can be individually controlled and adjusted, such that the rotation states of the liquid crystal molecules can be set to desired states for the liquid crystal lens unit. Thus, the phase delay curve of the liquid crystal lens unit can be substantially close to a standard curve, decreasing the phase difference of the liquid crystal lens unit due to abnormal fluctuations of the electric field, especially on both sides of the liquid crystal lens unit, further improving viewing experience with even no crosstalk.

Figure 15A:
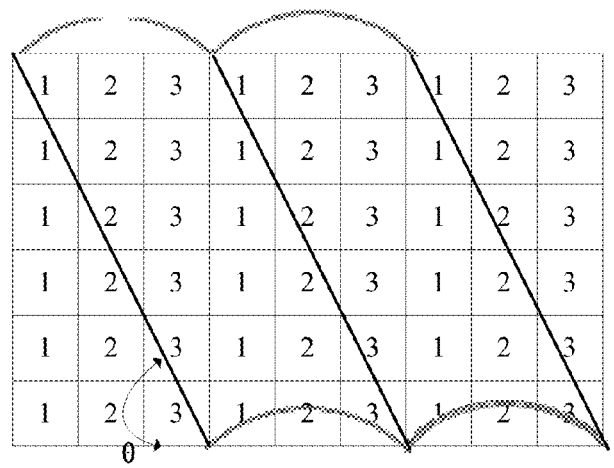
FIGS. 15A-15B illustrate an exemplary configuration of liquid crystal lens units and the pixels of the display panel consistent with the disclosed embodiments.
Figure 15B:
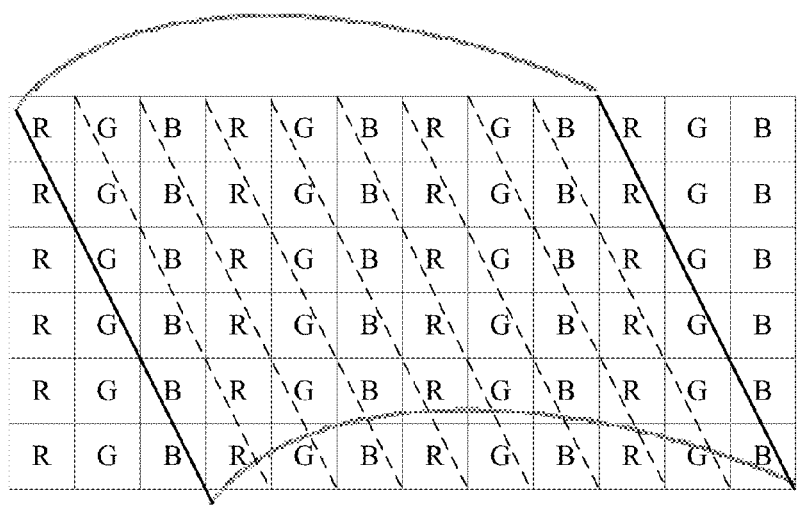

In certain embodiments, for display panels with a screen size less than a certain size, e.g., 20-inch, because the electrodes are arranged at an inclination angle, the electrodes of the liquid crystal lens array cross over the pixels of the display panel. Thus, the electrodes need to be configured and controlled based on the pixel arrangement. FIG. 15A and FIG. 15B illustrate an exemplary configuration of the liquid crystal lens units and the pixels of the display panel.

As shown in FIG. 15A, horizontally, each liquid crystal lens unit covers three pixels (marked as '1', '2', and '3' each row of pixels) of the display panel at an inclination angle $\theta$, as previously described in, e.g., descriptions corresponding to FIGS. 6-8. Further, each pixel may include three sub-pixels, as shown in FIG. 15B, marked as 'R', 'G', and 'B'.

Figure 23A:
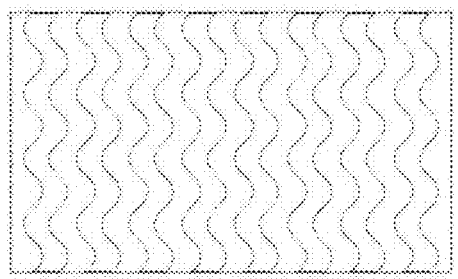
FIGS. 23A-23D shows exemplary shapes of electrodes used in the liquid crystal lens unit consistent with the disclosed embodiments.
Figure 23B:
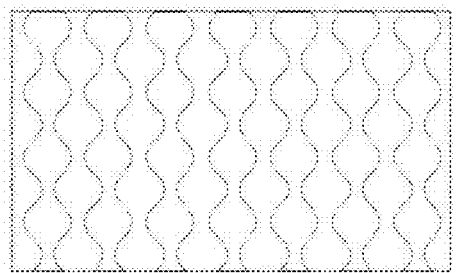
Figure 23C:
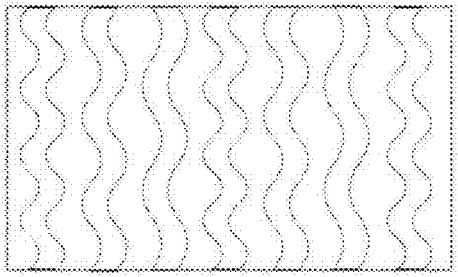
Figure 23D:
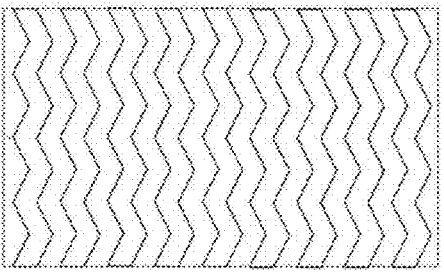

When each pixel of the display panel includes three sub-pixels, each electrode of the electrodes covers one sub-pixel, and the width of each electrode may be less than or equal to the width of the sub-pixel. The distance between parallel electrodes, i.e., the width between any two opposite electrodes, may be less than or equal to the width of the sub-pixel. The shape of the electrode may be curve, zig-zag line, or hyperbolic, etc. For example, FIG. 23A shows electrodes with same curve shape (e.g., sine or cosine curves) arranged in parallel; FIG. 23B shows electrodes with curve shape arranged in parallel but each pair of neighboring electrodes having a shift in peak and volley (e.g., a phase shift for sine or cosine curves); FIG. 23C shows electrodes with curve shapes of different curvature (e.g., different frequencies, amplitudes, and/or phases in since or cosine curves); and FIG. 23D shows electrodes with same zig-zag line arranged in parallel. Other shapes and arrangements can also be used. Further, the applied voltages on the plurality of electrodes are also in a symmetrical distribution along the center of the lens unit or slit element, i.e., grating element.

The pixels of the display panel may also have a certain shape. Pixels of different display panels may have different shapes. For example, pixels may have a pixel shape of a square, a trapezoid, or other irregular shape. Further, the sub-pixels in the pixel can be arranged differently depends on the type of display panel. Thus, the electrode covering the sub-pixel and/or pixels may be arranged based on the shape and arrangement of the pixels and/or sub-pixels. That is, the inclination direction (e.g., left or right) and angle $\theta$ of the electrodes may be determined based on the shape and arrangement of the pixels and/or sub-pixels.

Thus, a 9-electrode configuration may be used for the arrangement shown in FIG. 15A and FIG. 15B. That is, a total nine electrodes are used in a second electrode layer for one liquid crystal lens unit, while a first electrode layer may be a plate electrode or also may have a corresponding 9-electrode configuration. When the first and second electrode layers are both the 9-electrode configuration for one liquid crystal lens unit, the total nine electrodes in the second electrode layer are parallel to or cross over (e.g., perpendicular to) the total nine electrodes in the first electrode layer. In certain embodiments, the first electrode layer may also be omitted, as previously described, specially shown in FIGS. 14 and 15 and corresponding descriptions. Each electrode of the nine electrodes covers one sub-pixel, and the width of each electrode may be less than or equal to the width of the sub-pixel. The distance between parallel electrodes, i.e., the width between any two electrodes, may be less than or equal to the width of the sub-pixel. Thus, the rotation states of the liquid crystal molecules in the liquid crystal lens unit can be adjusted at multiple locations to form a desired liquid crystal lens unit.

Figure 16A:
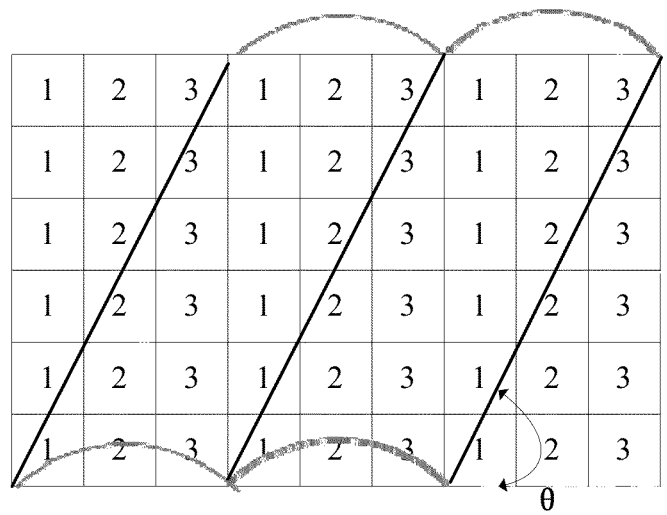
FIGS. 16A-16B illustrate another exemplary configuration of liquid crystal lens units and the pixels of the display panel consistent with the disclosed embodiments.
Figure 16B:
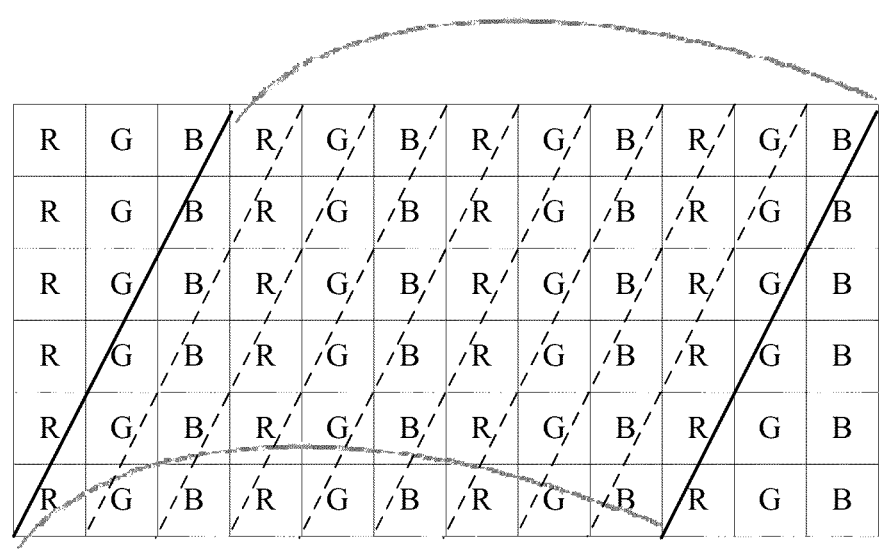

FIG. 16A and FIG. 16B illustrate another exemplary configuration of the liquid crystal lens units and the pixels of the display panel. As shown in FIG. 16A and FIG. 16B, another 9-electrode configuration is provided similar to those in the configuration in FIG. 15A and FIG. 15B. The difference is that, instead of a left inclination angle $\theta$, a right inclination angle $\theta$ (for example, with the same value) is used.

In certain embodiments, for display panels with a screen size greater than a certain size, e.g., 20-inch, another implementation may be provided. For example, within either the first electrode layer and/or the second electrode layer, as previously described, a plurality of electrodes are used for each liquid crystal lens unit. More specifically, the width of each of the electrodes at both sides of the liquid crystal lens unit is less than 30 µm, especially less than 20 µm, and the width of each of the other electrode between the two electrodes at both sides is less than ⅕ of the pitch of the liquid crystal lens unit. Further, the width between any two opposite electrodes is also less than 1/10 of the pitch of the liquid crystal lens unit. As previously described, the driving voltages applied at two electrodes on both sides of the liquid crystal lens unit are the largest and are greater than U-threshold. The applied voltages are further in a decreasing pattern from both sides to the center of the liquid crystal lens unit simultaneously and symmetrically. The driving voltages applied on any two electrodes symmetric along the center of the lens unit have the same voltage value. Thus, the liquid crystal lens unit is formed based on multiple electrodes configuration, and the driving voltages on the electrodes can be individually controlled and adjusted, such that there have been creating a desired liquid crystal lens unit.

Figure 17:
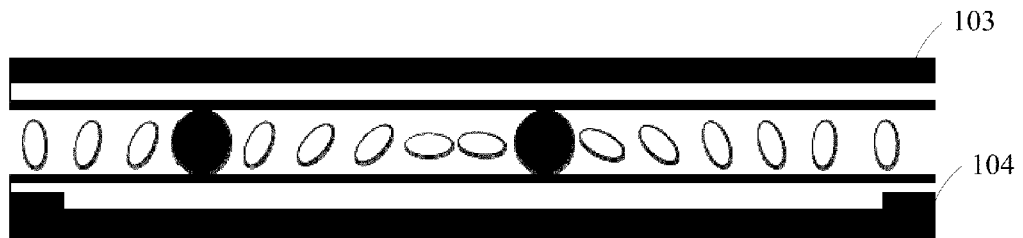
FIG. 17 illustrates a liquid crystal lens unit using a two-electrode configuration.

FIG. 17 illustrates a liquid crystal lens unit using a two-electrode configuration. As shown in FIG. 17, the first electrode layer 103 uses a plate shape electrode, and the second electrode layer 104 inches two electrodes at both sides of the lens. The display panel is a 5.5-inch display screen with a resolution of 720p, i.e., 1280×720 progressive scan. The electrodes are arranged at a left inclination angle of about 75 degrees, and the pitch of the lens is 0.256 mm.

Figure 18:
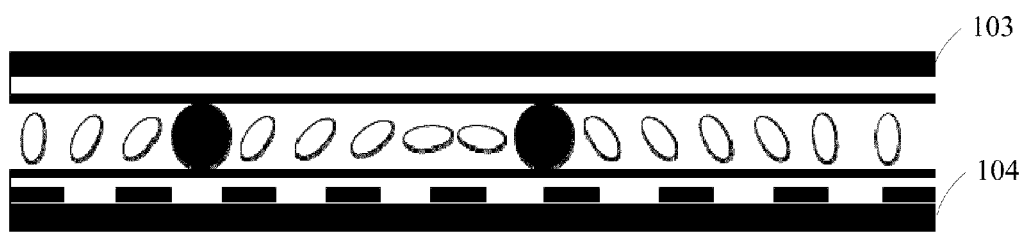
FIG. 18 illustrates a liquid crystal lens unit using a nine-electrode configuration.

FIG. 18 illustrates a liquid crystal lens unit using a nine-electrode configuration. As shown in FIG. 18, the first electrode layer 103 uses a plate shape electrode (maybe with a plurality of intervals, e.g. a liquid crystal lens unit with a single plate shape electrode, any two opposite liquid crystal lens units with the interval), and the second electrode layer 104 includes nine electrodes, with two at both sides of the lens, one in the center of the lens unit, and six in between and symmetrically along the center electrode. For the display screen of 5.5 inches with a resolution of 720p, the size of the sub-pixel is about 31 µm. Similarly, the pitch of the lens units is 0.256 mm, and the lens unit (i.e., the electrodes) is arranged at a left inclination angle of about 75 degrees. Further, the width of each of the electrodes is 15 µm, and the width between any two opposite electrodes of the electrodes is 17 µm. The plate shape electrode may be applied with a reference voltage or a 0 voltage. For the second electrode layer 104, driving voltages applied at two electrodes on both sides of the lens unit are the largest and are greater than U-threshold (threshold voltage of the liquid crystal molecules in the liquid crystal lens unit). The driving voltages are further in a decreasing pattern from both sides to the center of the lens unit simultaneously and symmetrically, and the driving voltages applied on any two opposite electrodes symmetric to the center of the lens are equal.

Figure 19A:
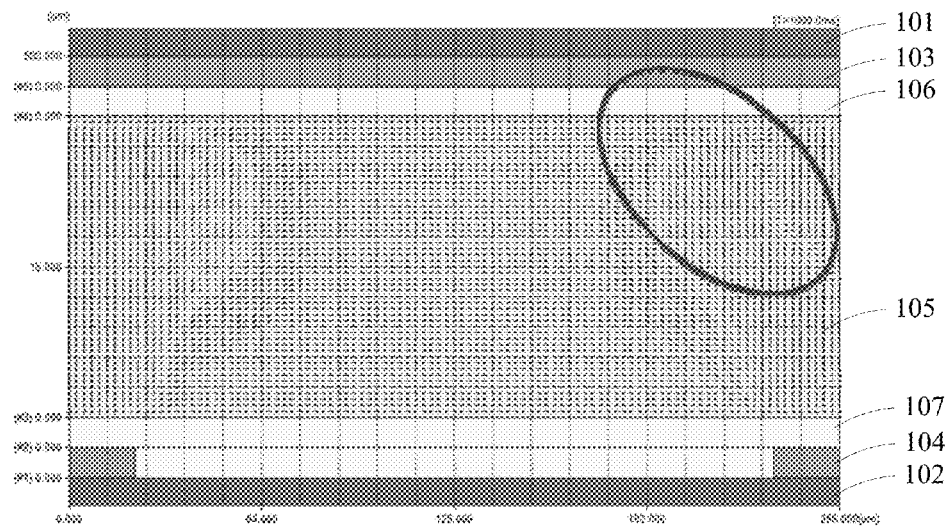
FIG. 19A shows testing data for the liquid crystal lens unit using the two-electrode configuration.

The two-electrode configuration and the nine-electrode configuration may be tested using certain testing equipment. For example, the two liquid crystal lens units (i.e., the two-electrode configuration and the nine-electrode configuration) may be tested using a phase delay equipment, and mathematical conversion can be performed on the testing data using MATLAB (e.g., converting the phase delay data into optical path data) for analysis and comparison. As used in the testing, the thickness of the liquid crystal box is 30 µm, the liquid crystal in the liquid crystal box has a normal refractive index no of 1.524 and an extraordinary refractive index ne of 1.824. FIG. 19A shows testing data for the two-electrode configuration, and FIG. 19B shows testing data for a multiple-electrode (e.g., a nine-electrode or a ten-electrode) configuration.

Figure 19B:
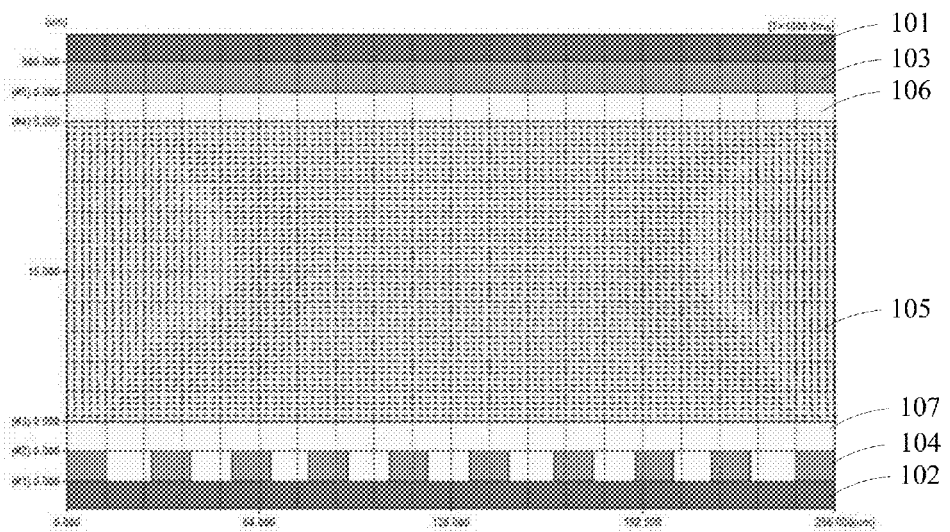
FIG. 19B shows testing data for the liquid crystal lens unit using the nine-electrode configuration.

FIG. 19A and FIG. 19B show two liquid crystal lens units with a two-electrode configuration and a multiple-electrode configuration, respectively. The x-axis represents horizontal distance (pitch value) of the liquid crystal lens unit and the y-axis represents vertical distance (e.g., thickness) of the liquid crystal lens unit. In both FIG. 19A and FIG. 19B, the liquid crystal lens unit include a first substrate 101, a first electrode layer 103, a first alignment layer 106, a liquid crystal layer 105, a second alignment layer 107, a second electrode layer 104, and a second substrate 102. The line segments in the liquid crystal layer 105 represents direction vector of the liquid crystal molecules.

Comparing FIG. 19A and FIG. 19B, it can be seen that two sides of the lens unit have certain zig-zag optical path fluctuation. Further, the curve in the multiple-electrode lens unit is closer to the standard curve than the two-electrode lens unit, and the optical path fluctuation on the sides of the multiple-electrode lens unit is less severe than that of the two-electrode lens unit.

Figure 20A:
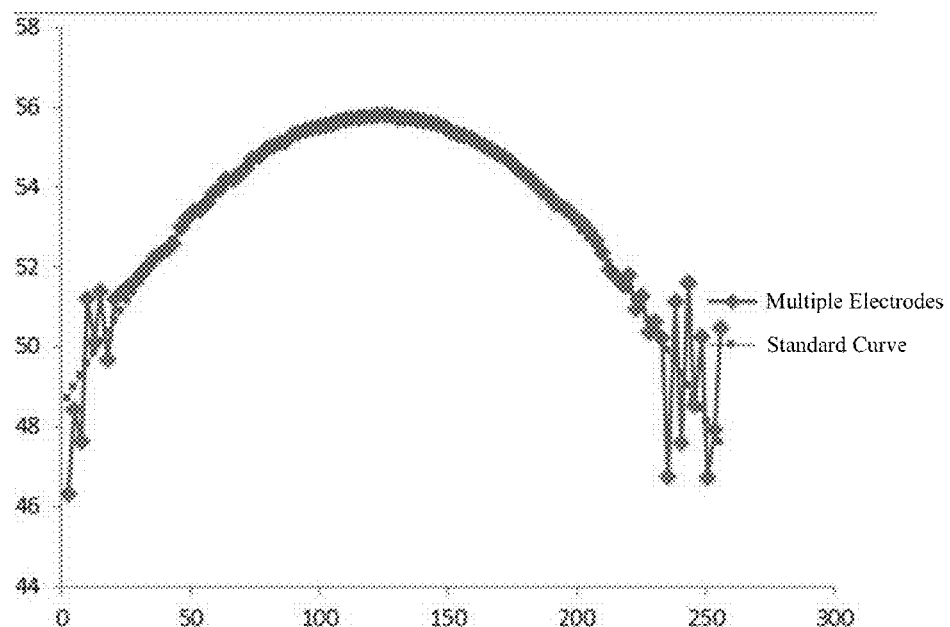
FIG. 20A shows comparison between the curve of the nine-electrode configuration liquid crystal lens unit and the standard curve.
Figure 20B:
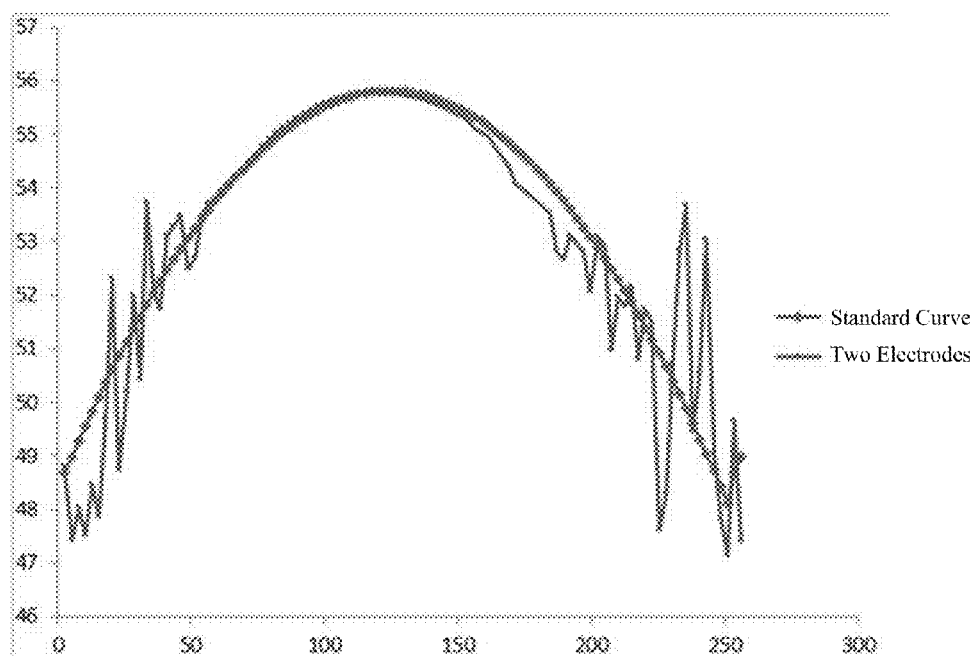
FIG. 20B shows comparison between the curve of the two-electrode configuration liquid crystal lens unit and the standard curve.

More specifically, FIG. 20A shows comparison between the phase delay curve of the multiple-electrode lens unit and the standard curve, and FIG. 20B shows comparison between the phase delay curve of the two-electrode lens unit and the standard curve. Similar conclusion can be made to FIG. 19A and FIG. 19B, the phase delay curve of the multiple electrodes liquid crystal lens unit can be substantially close to a standard curve, decreasing the phase difference of the liquid crystal lens unit due to abnormal fluctuations of the electric field, especially on both sides of the liquid crystal lens unit, further improving viewing experience with even no crosstalk.

Figure 21:
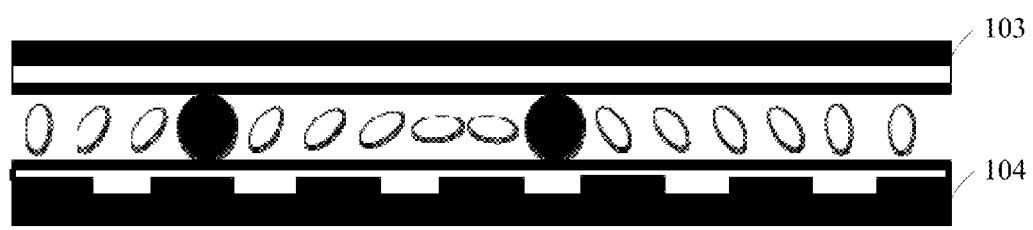
FIG. 21 illustrates another liquid crystal lens unit consistent with the disclosed embodiments.

FIG. 21 illustrates another liquid crystal lens unit consistent with the disclosed embodiments. The liquid crystal lens unit is for a 5.5-inch display screen with a 2K resolution, e.g., 2048×1080 pixels. The pitch of the lens units is 0.180 mm, and the lens unit (i.e., the electrodes) is arranged at a right inclination angle of about 75 degrees. Further, with the above screen size and resolution, the size of the sub-pixel is about 15 µm, and the width of the electrodes of the lens unit is 15 µm. The width between any two opposite electrodes of the electrodes is 15 µm, and a total of seven electrodes are used for each lens unit, i.e., a seven-electrode configuration. In other words, the first electrode layer 103 is a plate shape electrode (may be with a plurality of intervals, e.g. a liquid crystal lens unit with a single plate shape electrode, any two opposite liquid crystal lens units with the interval) and the second electrode layer 104 for the lens unit has seven electrodes. The plate shape electrode may be applied with a reference voltage or a 0-voltage. For the second electrode layer 104, driving voltages applied at two electrodes on both sides of the lens unit are the largest and are greater than U-threshold (threshold voltage of the liquid crystal molecules in the liquid crystal lens unit). The driving voltages are further in a decreasing pattern from both sides to the center of the lens unit simultaneously and symmetrically, and the driving voltages applied on any two opposite electrodes symmetric to the center of the lens are equal. Similarly, the seven-electrode configuration renders to decrease the phase difference of the liquid crystal lens unit due to abnormal fluctuations of the electric field, especially on both sides of the liquid crystal lens unit, further improving viewing experience with even no crosstalk.

Figure 22:
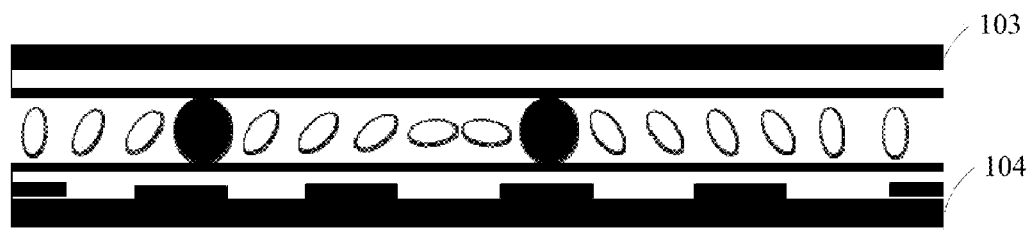
FIG. 22 illustrates another liquid crystal lens unit consistent with the disclosed embodiments.

FIG. 22 illustrates another liquid crystal lens unit consistent with the disclosed embodiments. The liquid crystal lens unit is for a 28-inch display screen with a 2K resolution, e.g., 2048×1080 pixels. That is, with the above screen size and resolution, the size of the sub-pixel is about 57 μm. The pitch of the lens units is 0.330 mm, and the lens unit (i.e., the electrodes) is arranged at a left inclination angle of about 70 degrees. Further, for each lens unit, in the second electrode layer, two electrodes at the both sides of the lens unit have a width of 15 μm, and the width of the other electrodes between the two electrodes at both sides is 20 μm. Further, the width (i.e. the distance) between any two opposite electrodes is also 30 μm.

Thus, the first electrode layer 103 is a plate shape electrode (maybe with a plurality of intervals, e.g. a liquid crystal lens unit with a single plate shape electrode, any two opposite liquid crystal lens units with the interval) and the second electrode layer 104 for the lens unit includes multiple electrodes as configured above. The plate shape electrode may be applied with a reference voltage or a 0-voltage. For the second electrode layer 104, driving voltages applied at two electrodes on both sides of the lens unit are the largest and are greater than U-threshold (threshold voltage of the liquid crystal molecules in the liquid crystal lens unit). The driving voltages are further in a decreasing pattern from both sides to the center of the lens unit simultaneously and symmetrically, and the driving voltages applied on any two opposite electrodes symmetric to the center of the lens are equal. The same as the above, the rotation states of the liquid crystal molecules in the liquid crystal lens unit can be adjusted at multiple locations to form a desired liquid crystal lens unit. The multiple electrodes configuration can decrease the phase difference of the liquid crystal lens unit due to abnormal fluctuations of the electric field, especially on both sides of the liquid crystal lens unit, further improving viewing experience with even no crosstalk.

Thus, the disclosed systems and methods can effectively reduce or remove Moire pattern in 3D display and also improve display quality of the 3D display. The disclosed arrangements of gratings and display panels can achieve effects of even separation of display elements while maintain a large adjustment range to fit structures of most display elements of display panels in the market.

Further, the disclosed system and methods can provide effective multi-electrode configuration of the electrodes in the liquid crystal lens/slit array or gratings to improve 3D display. The phase delay curve of the liquid crystal lens unit can be substantially close to a standard curve, decreasing the phase difference of the liquid crystal lens unit due to abnormal fluctuations of the electric field, especially on both sides of the lens unit, further improving viewing experience with even no crosstalk. Other applications, advantages, alternations, modifications, or equivalents to the disclosed embodiments are obvious to those skilled in the art.

What is claimed is:

1. A three-dimensional (3D) display apparatus for displaying a 3D image, comprising:
   a display panel having a plurality of display pixels arranged in a two-dimensional array, each pixel comprising multiple sub-pixels; and
   a grating device coupled to the display panel and having a plurality of grating elements based on liquid crystal to guide lights associated with the plurality of display pixels into predetermined viewing directions, the grating device being one of a lenticular lens grating and a slit grating,
   wherein:
   the plurality of grating elements are arranged in parallel;
   the plurality of grating elements cover the plurality of display pixels and are tilted at an inclination angle with respect to the display pixels, and each grating element comprises a plurality of electrodes arranged at the inclination angle to cause the liquid crystal to form the grating element when being applied with various driving voltages; and
   a width of the electrodes is less than or equal to a width of a sub-pixel, and a width between any two electrodes is less than or equal to the width of a sub-pixel.

2. The 3D display apparatus according to claim 1, wherein:
   the inclination angle is determined, based on shape and arrangement of the display pixels and sub-pixels, by rotating a ridge line direction of the plurality of grating elements with respect to a diagonal direction of the plurality display pixels by a non-zero angle from a direction parallel to the diagonal direction such that a tilted direction of the plurality of grating elements forms the non-zero angle with respect to the diagonal direction of the plurality display pixels to cause irregularity preventing Moire patterns.

3. The 3D display apparatus according to claim 2, wherein:
   the inclination angle is a left inclination angle of approximately 75 degrees;
   a pitch of the grating elements is approximately 0.256 mm;
   the width of the electrodes is approximately 15 μm; and
   the width between the electrodes is approximately 17 μm.

4. The 3D display apparatus according to claim 3, wherein:
   a total number of the plurality of electrodes corresponding to a grating element is nine.

5. The 3D display apparatus according to claim 2, wherein:
   the inclination angle is a right inclination angle of approximately 75 degrees;
   a pitch of the grating elements is approximately 0.180 mm;
   the width of the electrodes is approximately 15 μm; and
   the width between the electrodes is approximately 15 μm.

6. The 3D display apparatus according to claim 5, wherein:
   a total number of the plurality of electrodes corresponding to a grating element is seven.

7. The 3D display apparatus according to claim 2, wherein:
   the inclination angle is a left inclination angle of approximately 70 degrees;
   a pitch of the grating elements is approximately 0.330 mm;
   the width of two electrodes at both sides of a grating element is approximately 15 μm; and
   the width of electrodes between the two electrodes in the grating element is approximately 20 μm; and
   the width between the electrodes is approximately 30 μm.

8. The 3D display apparatus according to claim 2, wherein:
   the width of each of the electrodes at both sides of a grating element is less than 30 μm;
   the width of each of other electrodes between the two electrodes at both sides of the grating element is less than 1/15 of a pitch of the grating elements; and
   a width between any two opposite electrodes is less than 1/10 of the pitch of the grating elements.

9. The 3D display apparatus according to claim 1, wherein:
driving voltages applied on two electrodes at both sides of a grating element is greater than driving voltages applied on electrodes between the two electrodes in the grating element, and is also greater than a threshold voltage of liquid crystal molecules in the liquid crystal contained in the grating element.

10. The 3D display apparatus according to claim 9, wherein:
driving voltages applied on the plurality of electrodes decrease from both sides to a center of the grating element simultaneously; and
driving voltages on any two electrodes symmetric to the center of the grating element are equal.

11. The 3D display apparatus according to claim 1, wherein the plurality of display pixels include a first set of display pixels displaying a first view point image of the 3D image and a second set of display pixels displaying a second view point image of the 3D image, the 3D display apparatus further comprising:
a controller for re-calculating a display value of a display pixel from the first set of display pixels based on an original value of the display pixel and an original value of a neighboring display pixel from the second set of display pixels, as a mix of the original value of the display pixel and the original value of a neighboring display pixel.

12. A grating device for use in a three-dimensional (3D) display apparatus having a display panel containing a plurality of display pixels arranged in a two-dimensional array, wherein each pixel comprising multiple sub-pixels and the grating device is coupled to the display panel, the grating device comprising:
a plurality of grating elements based on liquid crystal to guide lights associated with the plurality of display pixels into predetermined viewing directions, the grating device being one of a lenticular lens grating and a slit grating, wherein:
the plurality of grating elements are arranged in parallel;
the plurality of grating elements are arranged to cover the plurality of display pixels and are tilted at an inclination angle with respect to the display pixels, and each grating element comprises a plurality of electrodes arranged at the inclination angle to cause the liquid crystal to form the grating element when being applied with various driving voltages; and
a width of the electrodes is less than or equal to a width of a sub-pixel, and a width between any two electrodes is less than or equal to the width of a sub-pixel.

13. The grating device according to claim 12, wherein:
the inclination angle is determined, based on shape and arrangement of the display pixels and sub-pixels, by rotating a ridge line direction of the plurality of grating elements with respect to a diagonal direction of the plurality display pixels by a non-zero angle from a direction parallel to the diagonal direction such that a tilted direction of the plurality of grating elements forms the non-zero angle with respect to the diagonal direction of the plurality display pixels to cause irregularity preventing Moire patterns.

14. The grating device according to claim 13, wherein:
the inclination angle is a left inclination angle of approximately 75 degrees;
a pitch of the grating elements is approximately 0.256 mm;
the width of the electrodes is approximately 15 µm; and
the width between the electrodes is approximately 17 µm.

15. The grating device according to claim 14, wherein:
a total number of the plurality of electrodes corresponding to a grating element is nine.

16. The grating device according to claim 13, wherein:
the inclination angle is a right inclination angle of approximately 75 degrees;
a pitch of the grating elements is approximately 0.180 mm;
the width of the electrodes is approximately 15 µm; and
the width between the electrodes is approximately 15 µm.

17. The grating device according to claim 16, wherein:
a total number of the plurality of electrodes corresponding to a grating element is seven.

18. The grating device according to claim 13, wherein:
the inclination angle is a left inclination angle of approximately 70 degrees;
a pitch of the grating elements is approximately 0.330 mm;
the width of two electrodes at both ends of a grating element is approximately 15 µm; and
the width of electrodes between the two electrodes in the grating element is approximately 20 µm; and
the width between the electrodes is approximately 30 µm.

19. The grating device according to claim 13, wherein:
the width of each of the electrodes at both sides of a grating element is less than 30 µm;
the width of each of other electrodes between the two electrodes at both sides of the grating element is less than 1/15 of a pitch of the grating elements; and
a width between any two opposite electrodes is less than 1/10 of the pitch of the grating elements.

20. The grating device according to claim 12, wherein:
driving voltages applied on two electrodes at both sides of a grating element is greater than driving voltages applied on electrodes between the two electrodes in the grating element, and is also greater than a threshold voltage of liquid crystal molecules in the liquid crystal contained in the grating element.

21. The grating device according to claim 20, wherein:
driving voltages applied on the plurality electrodes decrease from both sides to a center of the grating element simultaneously; and
driving voltages on any two electrodes symmetric to the center of the grating element are equal.

22. The grating device according to claim 12, wherein the plurality of display pixels include a first set of display pixels displaying a first view point image of the 3D image and a second set of display pixels displaying a second view point image of the 3D image, the 3D display apparatus further comprising:
a controller for re-calculating a display value of a display pixel from the first set of display pixels based on an original value of the display pixel and an original value of a neighboring display pixel from the second set of display pixels, as a mix of the original value of the display pixel and the original value of a neighboring display pixel.

* * * * *